United States Patent Office 2,910,576
Patented Oct. 27, 1959

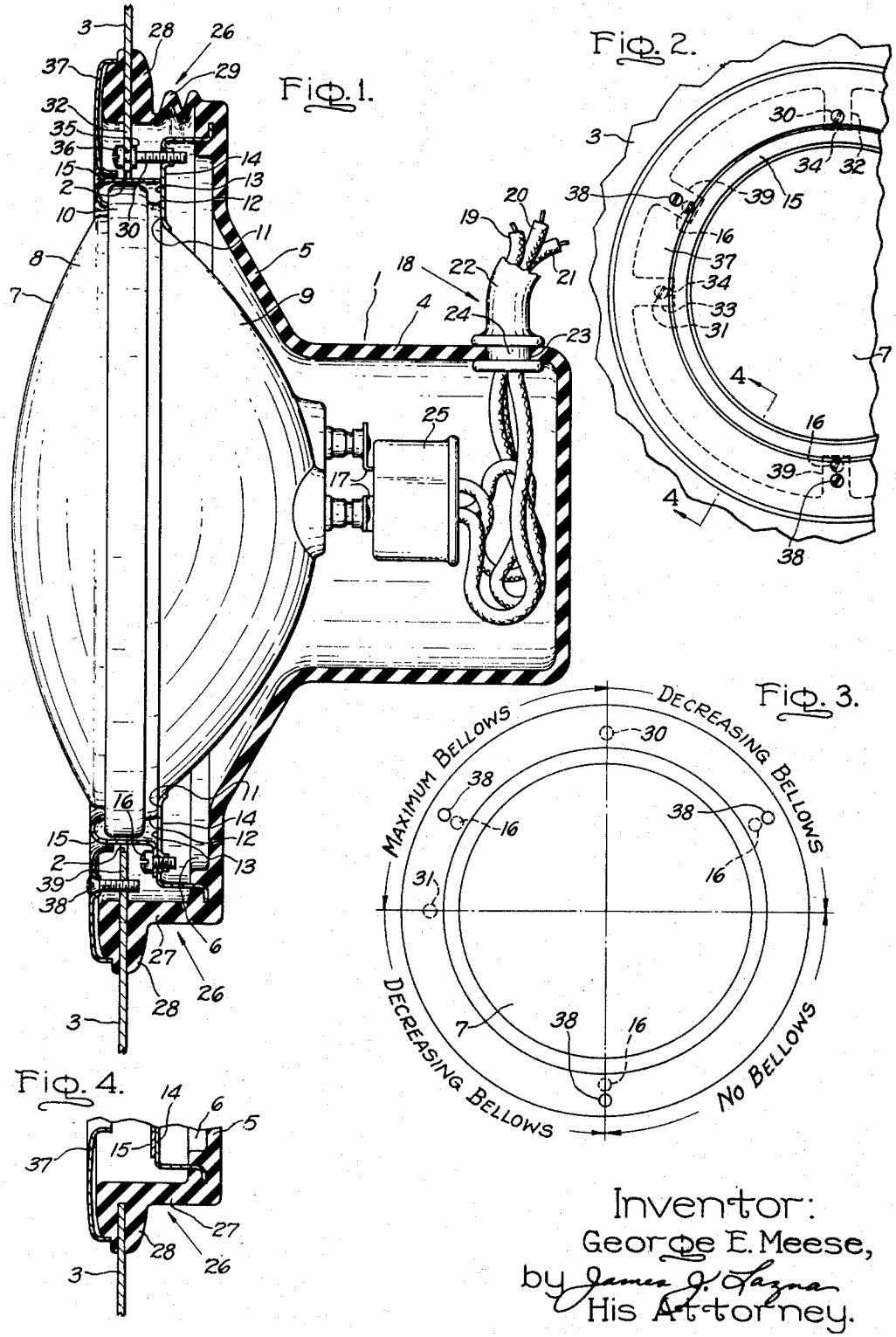

2,910,576

VEHICLE HEADLAMP MOUNTING

George E. Meese, Lyndhurst, Ohio, assignor to General Electric Company, a corporation of New York Application March 15, 1957, Serial No. 646,294

2 Claims. (Cl. 240—41.6)

This invention relates to mounting arrangements for securing unitary headlamp assemblies or units on automotive vehicles, and more particularly to a mounting arrangement of the adjustable type for permitting a limited amount of angular adjustment of the optical axis of the headlamp unit both vertically and horizontally for lamp aiming purposes.

The lamp units commonly used in automobile headlamps at the present time comprise a reflector, lens and light source sealed as a unit to prevent the entrance of dust and moisture which reduce the efficiency of the reflector. Such reflector-type lamp units are commonly referred to as sealed beam lamps and are of the general construction disclosed in U.S. Patent 2,148,314, Wright, issued February 21, 1939 and assigned to the assignee of the present invention.

In mounting arrangements for headlamp units for use in automobiles and other vehicles, it is customary practice to provide means for angularly adjusting the optical axis of the lamp unit both vertically and horizontally in order to permit proper aiming of the headlamp unit. The prior headlamp mounting arrangements of such aimable type, however, have generally been of rather complicated construction and have utilized a considerable number of parts and a considerable content of metal such as renders the lamp mounting an expensive cost item.

It is an object of my invention, therefore, to provide a vehicle headlamp mounting arrangement of the aimable type which is simple in construction and relatively inexpensive and having equal quality and performance to that of prior mounting arrangements.

Another object of my invention is to provide a vehicle headlamp mounting arrangement of the aimable type which utilizes a minimum number of parts and is characterized by relatively low metal content.

Still another object of my invention is to provide a vehicle headlamp mounting arrangement of the aimable type possessing improved shock and vibration absorption characteristics as compared to that of prior mounting arrangements.

Briefly stated, in accordance with one aspect of the invention, the sealed beam lamp unit is fixedly mounted in place in a one-piece body or housing member molded of rubber or pliable synthetic material and having an open end within which the lamp unit is positioned and fixedly held in place, against a lamp seating surface located on the housing member adjacent its open end, by means of a lamp retaining ring member. The housing member is supported in place, within an opening in the support member or fender of the vehicle, by support means comprising a short annular wall portion on the housing member which is secured to the support member around the rim of the opening therein and is constituted, throughout at least 180° and up to 270° of its annular extent, of a bellows section which is expansible and contractible in the direction of the axis of the lamp unit mounted in the housing to provide a limited amount of rocking adjustment of the housing member relative to the support member for lamp aiming purposes. Adjustable fastening means connecting the support and housing members at spaced points around the annular extent of the open end of the housing member, and located within that portion of its annular extent provided with bellows, provide for adjusting the position of the housing member and the associated lamp unit relative to the support member to thereby obtain proper aiming of the headlamp.

According to a further aspect of the invention, the bellows are molded in the housing member as a unitary part thereof and they are of maximum magnitude or number and yieldability within the middle portion of their annular extent and of gradually diminishing magnitude or number and yieldability at each side of the said middle portion. The adjustable fastener means interconnect the support and housing members at two points spaced approximately 90° apart around the annular extent of the housing member, i.e., at the top and at one side thereof, and are located at the limits of the said middle or maximum yieldability portion of the annular extent of the bellows.

Further objects and advantages of my invention will appear from the following detailed description of a species thereof and from the accompanying drawings.

In the drawing,

Fig. 1 is a vertical sectional view through a vehicle headlamp mounting arrangement comprising my invention, with the associated sealed beam lamp unit shown in elevation.

Fig. 2 is a fragmentary front elevation of the headlamp mounting arrangement.

Fig. 3 is a diagrammatic front elevational view of the headlamp mounting arrangement illustrating the relative locations of the headlamp aiming adjustment means and the maximum and gradually diminishing yieldability sections of the bellows molded in the headlamp housing, and Fig. 4 is a fragmentary sectional view on the line 4—4 of Fig. 2.

Referring to the drawing, the headlamp mounting arrangement therein illustrated comprises a body or housing member 1 adapted for recessed mounting in an aperture or opening 2 in a lamp support member 3 such as a fender or body panel of a vehicle. The housing member 1 is molded of rubber or pliable synthetic material and it is of more or less cup shape comprising a cylindrical inner portion 4 and an outwardly extending annular outer flange portion 5 terminating in an open end 6 within which a lamp unit 7 is mounted and fixedly secured to the housing member. The lamp unit 7 may be of the all glass sealed beam type such as is commonly employed for automotive headlamps at present and comprising a glass lens section 8 and a glass reflector section 9 fusion sealed together to form the lamp envelope or bulb within which a light source or filament (not shown) is sealed. The lamp unit 7 is provided around its rim with an outwardly extending annular flange 10 formed on its back side either with a continuous lamp seating surface 11 as shown, or with a series of spaced seating surfaces 11, disposed in a plane transverse to the optical axis of the lamp unit, the said seating surface or surfaces 11 being afforded by either a continuous annular ledge or shoulder 12 formed on the back side of the flange 10 as shown, or by a group of three or more seating pads formed on the back side of the flange 10 and spaced around the annular extent thereof.

The housing member 1 is provided with an annular lamp seating means or mounting surface 13 which extends around the periphery of its outer flange portion 5 and on which the seating surface or surfaces 11 of the lamp unit 7 are adapted to seat to properly mount the lamp unit in position within the housing member. As shown, the lamp seating means or mounting surface 13 may be constituted by a metal ring or collar member 14 molded into the periphery of the flange portion 5 of the housing member 1. The lamp unit 7 is secured in place within the housing member 1, in seated position on the mounting ring 14, by means of a lamp retainer ring 15 which fits over and engages the outer side of the flange 10 on the lamp unit and is secured to the lamp mounting ring 14 in a suitable manner, as by means of a plurality (three in the particular case illustrated) of lamp retainer screws 16 spaced around the annular extent of the rings 14 and 15, as indicated in Fig. 3, and having screw-thread engagement with the mounting ring. The electrical circuit connections to the contact terminals or prongs 17 of the lamp unit 7 may be provided by a wiring harness 18 consisting of the customary three current-carrying conductors 19, 20 and 21 enclosed within and extending through a rubber enclosure tube 22 which is fastened at one end within an opening 23 in the wall of the inner portion 4 of the housing member 1 by means of a grommet portion 24 formed on the enclosure tube. The conductors 19, 20 and 21 extend through the enclosure tube 22 and into the interior of the housing member 1 where they terminate in a connector socket member 25 which is adapted to be plugged onto the contact terminals or prongs 17 of the lamp unit 7 to effect the electrical connection of the lamp unit into the electrical operating circuit therefor.

The housing member 1 is supported around the periphery of its outer flange portion 5, on the support member 3, around the rim of the opening 2 therein, by yieldable support means 26 which, in accordance with the invention, is constituted throughout at least 180° and up to 270° of its annular extent, of resilient material yieldable in the direction of the axis of the opening 2 in the support member 3, to permit a limited amount of rocking adjustment movement of the housing member 1 relative to the support member 3 in intersecting axial planes of the housing member disposed normal to one another, i.e., in both the vertical and horizontal axial planes of the housing member 1 and the lamp unit 7 secured therein. In the particular case illustrated, the said housing support means 26 is comprised of a short tubular or cylindrical wall portion 27 extending from the periphery of the outer flange portion 5 of the housing member 1 and preferably molded as a unitary part thereof, the said wall portion 27 terminating in an annular grommet portion 28 adapted to fit snugly over and around the rim of the opening 2 in the support member 3, as shown in Fig. 4, to support the housing member 1 in place thereon. The tubular wall portion 27 is formed throughout at least 180° and up to 270° of its annular extent with an integral bellows 29 molded into the housing member and extensible and contractible in the direction of the axis of the housing member and the opening 2 in the support member 3 to afford the above-mentioned limited amount of rocking movement of the housing member relative to the support member. The annular extent of the bellows 29 is approximately symmetrically located with respect to one of the 90° quadrants of the annular extent of the tubular wall portion 27, i.e., the upper left hand quadrant in the particular case shown. Thus, where the bellows 29 have an annular extent of approximately 180°, they may extend throughout the upper left hand quadrant, and approximately 45° beyond each side of the upper left hand quadrant of the annular extent of the tubular wall portion 27. In the same manner, where the bellows 29 have an annular extent of approximately 270°, they may extend throughout the entire upper left hand quadrant and also throughout the entire upper right hand and lower left hand quadrants as well, as indicated in Fig. 3. As shown in Fig. 1, the remaining portion of the annular extent of the tubular wall portion 27 of the housing member 1, i.e., the portion not provided with bellows 29, is formed as a relatively heavy or thick wall section of resilient material so as to possess only a slight degree of yieldability in the direction of the coincident axes of the housing member 1 and the opening 2 in the support member 3.

As indicated in Fig. 3, the bellows 29 preferably are graduated in magnitude or number and yieldability throughout their annular extent so as to be of greatest magnitude or number and yieldability throughout one (e.g., the upper left hand) quadrant of their annular extent and of gradually diminishing magnitude or number and yieldability to each side of said quadrant. With such a bellows construction, the tubular wall portion 27 of the housing member 1 will possess greatest yieldability, and the housing member 1 will have maximum rocking movement, at a point around their annular extent located within the said one (e.g., the upper left hand) quadrant thereof and in an axial plane inclined at approximately 45° to the vertical and horizontal axial planes of the housing member and associated lamp unit 7.

The housing member 1 and the associated lamp unit 7 are adjustable to and held in the desired lamp-aiming position within the support member 3 by means of suitable adjustment fastener means preferably in the form of a pair of lamp aiming screws 30 and 31 which interconnect the housing and support members 1 and 3, respectively, at spaced points around their annular extent, i.e., at the top and at the left hand side thereof as shown in Fig. 3. The aiming screws 30 and 31 have a rotatable but longitudinally interlocked fit with one of the members 1 and 3, and a screw-threaded fit with the other one of said members. Thus, as shown in Fig. 1, the lamp aiming screws 30 and 31 have a screw-threaded fit with the lamp mounting ring 14 on the housing member 1 and a rotatable but longitudinally interlocked fit with the support member 3 which, for such purpose, is provided with a pair of fastener tabs or tongues 32 and 33 around the rim of the opening 2 in the support member 3. The tabs 32 and 33 extend radially inward of the opening 2 through the grommet portion 28 of the housing member 1 and are slotted, as indicated at 34 in Fig. 2, to receive the respective aiming screws 30 and 31, the tabs fitting between collars 35 (Fig. 1) on the screws 30, 31 and the heads 36 thereon to lock the screws to the tabs against longitudinal displacement relative thereto. Because of the yieldability afforded by the bellows 29, rotation of the aiming screws 30, 31 will operate to move either the top region or the left hand side region of the lamp mounting ring 14 either toward or away from the support member 3, depending upon which aiming screw is turned and the direction of turning movement thereof. The lamp unit 7 is thereby adjusted to the desired aimed position relative to the support member 3, the top aiming screw 30 controlling the vertical aiming of the light beam projected by the lamp unit and the side aiming screw 31 controlling the horizontal or lateral aiming of the light beam.

In accordance with conventional practice, and to prevent the ingress of dust, dirt, moisture and other foreign material into the interior of the housing member 1, a trim ring 37 is fastened to the outer side of the support member 3 around the opening 2 therein and over the grommet 28 and around the lamp retainer ring 15 so as to close off the annular space between the lamp retainer ring and the grommet 28 of the housing member 1. The trim ring 37 may be fastened in place on the support member 3 by any suitable means, as by a plurality of screw fasteners 38 spaced around the annular extent of the trim ring and having screw-threaded engagement with tabs 39 on the support member 3 similar to the tabs 32 for the aiming screws 30, 31.

From the above description, it will be apparent that I have provided a vehicle headlamp mounting arrangement of the adjustable type for lamp aiming, which is of simple and inexpensive construction and incorporates a minimum content of metal. Moreover, in addition to affording a means for adjusting the aiming position of the lamp unit 7 mounted therein, the housing member 1, because of its formation out of rubber or pliable synthetic material, also affords a certain degree of resistance to shock or vibration such as serves to protect the lamp unit 7 and the relatively fragile filament therein against damage or breakage.

Although a preferred embodiment of my invention has been disclosed, it will be understood that the invention is not to be limited to the specific construction and arrangement of parts shown, but that they may be widely modified within the spirit and scope of my invention as defined by the appended claims.

What I claim as new and desire to secure by United States Letters Patent is:

1. A vehicle headlight assembly comprising, in combination, a rigid support member having an opening therein to receive a reflector-type lamp unit, a one-piece molded rubber lamp-receiving housing member secured to said support member within the said opening therein, said housing member having an open end and including an outward annular integral rubber flange portion terminating in a tubular integral rubber wall portion at the open end of said housing member, lamp seating means on the said flange portion of said housing member for positioning the lamp unit therein with the axis of its reflector extending in the direction of the axis of said opening, lamp retainer means securing said lamp unit within said housing member in seated position on the said seating means thereof, said tubular wall portion being secured to said support member around the rim of the opening therein to support the housing on said support member, said tubular wall being constituted, throughout at least 180° and up to 270° of its annular extent, of a rubber bellows extensible and contractible in the direction of the axis of said opening to provide limited rocking adjustment movement of said housing member relative to said support member in axial planes of said opening normal to each other, and adjustment screw fastener means interconnecting said support and housing members at spaced points around the annular extent of said flange and having screw-threaded engagement with one of said members for adjusting the position of said housing member relative to said support member within each of the said planes of its said rocking adjustment movement.

2. A vehicle headlight assembly as specified in claim 1 wherein the said bellows are of maximum magnitude and yieldability throughout approximately the middle portion of their annular extent and of gradually diminishing magnitude and yieldability at each side of said middle portion and wherein the said adjustment screw-fastener means interconnect the said support and housing members at points spaced approximately 90° apart around the annular extent of the said flange on said housing member and located at the limits of the said middle portion of the annular extent of said bellows.

References Cited in the file of this patent

UNITED STATES PATENTS

| | | |
|---|---|---|
| 2,011,868 | Michel | Aug. 20, 1935 |
| 2,225,981 | Casson | Dec. 24, 1940 |
| 2,800,578 | Falge | July 23, 1957 |
| 2,824,214 | Bertsche | Feb. 18, 1958 |